United States Patent
Lee et al.

(10) Patent No.: US 10,149,118 B2
(45) Date of Patent: Dec. 4, 2018

(54) METHOD AND APPARATUS FOR TRANSMITTING SERVICE INTEREST INDICATION MESSAGE IN WIRELESS COMMUNICATION SYSTEM

(71) Applicant: LG ELECTRONICS INC., Seoul (KR)

(72) Inventors: Young Dae Lee, Anyang-si (KR); Seung June Yi, Anyang-si (KR); Sung Jun Park, Anyang-si (KR); Sung Hoon Jung, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 118 days.

(21) Appl. No.: 14/118,839

(22) PCT Filed: Oct. 2, 2012

(86) PCT No.: PCT/KR2012/007978
§ 371 (c)(1),
(2) Date: Nov. 19, 2013

(87) PCT Pub. No.: WO2013/051832
PCT Pub. Date: Apr. 11, 2013

(65) Prior Publication Data
US 2014/0105095 A1    Apr. 17, 2014

Related U.S. Application Data

(60) Provisional application No. 61/542,758, filed on Oct. 3, 2011.

(51) Int. Cl.
*H04W 4/06* (2009.01)
*H04W 36/08* (2009.01)
*H04W 36/00* (2009.01)

(52) U.S. Cl.
CPC ......... *H04W 4/06* (2013.01); *H04W 36/0061* (2013.01); *H04W 36/08* (2013.01)

(58) Field of Classification Search
CPC .............................. H04W 4/06; H04W 36/006
See application file for complete search history.

(56) References Cited

U.S. PATENT DOCUMENTS

2003/0119452 A1* 6/2003 Kim .................... H04W 52/143
455/69
2003/0207696 A1* 11/2003 Willenegger ......... H04W 52/40
455/522

(Continued)

FOREIGN PATENT DOCUMENTS

EP       2 068 522 A1   6/2009
KR    10-2006-0090134 A   8/2006

(Continued)

*Primary Examiner* — Gregory Sefcheck
*Assistant Examiner* — Jael Ulysse
(74) *Attorney, Agent, or Firm* — Birch, Stewart, Kolasch & Birch, LLP

(57) ABSTRACT

Provided are a method and an apparatus for transmitting a multimedia broadcast/multicast service (MBMS) interest indication message in a wireless communication system. A user equipment (UE) receives from a first base station system information for an MBMS which is broadcasted, and transmits the MBMS interest indication message to the first base station when the user equipment performs a handover from a second base station, which does not broadcast the system information for the MBMS, to the first base station.

8 Claims, 7 Drawing Sheets

(56) References Cited

U.S. PATENT DOCUMENTS

| | | | |
|---|---|---|---|
| 2004/0147266 A1* | 7/2004 | Hwang | H04W 72/005 455/445 |
| 2004/0180675 A1* | 9/2004 | Choi | H04L 12/1877 455/458 |
| 2004/0202140 A1* | 10/2004 | Kim | H04W 72/005 370/335 |
| 2004/0253959 A1* | 12/2004 | Hwang | H04W 72/005 455/450 |
| 2005/0007971 A1* | 1/2005 | Jeong | H04L 12/189 370/312 |
| 2005/0020260 A1* | 1/2005 | Jeong | H04W 72/005 455/434 |
| 2005/0041608 A1* | 2/2005 | Jeong | H04L 12/189 370/310 |
| 2005/0079870 A1* | 4/2005 | Rick | H04W 60/04 455/437 |
| 2005/0090278 A1* | 4/2005 | Jeong | H04W 36/0055 455/525 |
| 2005/0111393 A1* | 5/2005 | Jeong | H04W 68/00 370/312 |
| 2005/0111395 A1* | 5/2005 | Hwang | H04L 12/1877 370/313 |
| 2005/0118992 A1* | 6/2005 | Jeong | H04W 4/06 455/422.1 |
| 2005/0143107 A1* | 6/2005 | Pattar | H04W 4/06 455/466 |
| 2005/0237961 A1* | 10/2005 | Yi | H04W 36/30 370/312 |
| 2005/0272459 A1* | 12/2005 | Lee | H04B 7/2603 455/522 |
| 2006/0034225 A1 | 2/2006 | Jung et al. | |
| 2006/0035644 A1* | 2/2006 | Niwano | H04W 36/16 455/450 |
| 2006/0058034 A1* | 3/2006 | Vaittinen | H04W 36/0055 455/450 |
| 2006/0058047 A1 | 3/2006 | Jeong et al. | |
| 2006/0067353 A1* | 3/2006 | Pekonen | H04L 12/189 370/432 |
| 2006/0068780 A1* | 3/2006 | Dalsgaard | H04W 48/10 455/432.3 |
| 2006/0079239 A1 | 4/2006 | Kwak et al. | |
| 2006/0084443 A1* | 4/2006 | Yeo | H04W 36/0061 455/449 |
| 2006/0140148 A1* | 6/2006 | Kwak | H04W 36/10 370/329 |
| 2006/0245386 A1* | 11/2006 | Hu | H04W 72/005 370/312 |
| 2008/0267109 A1* | 10/2008 | Wang | H04W 72/005 370/312 |
| 2008/0267136 A1 | 10/2008 | Baker et al. | |
| 2008/0287129 A1* | 11/2008 | Somasundaram | H04W 36/0055 455/436 |
| 2009/0010225 A1* | 1/2009 | Gupta | H04W 36/24 370/331 |
| 2009/0047953 A1* | 2/2009 | Proctor | H04W 36/0055 455/435.2 |
| 2009/0176495 A1* | 7/2009 | Beming | H04W 36/12 455/436 |
| 2010/0061308 A1* | 3/2010 | Becker | H04W 60/04 370/328 |
| 2010/0110960 A1* | 5/2010 | Kim | H04L 1/1861 370/312 |
| 2010/0178920 A1* | 7/2010 | Kitazoe | H04W 36/0055 455/436 |
| 2010/0191965 A1* | 7/2010 | Fischer | H04L 63/123 713/168 |
| 2010/0202307 A1* | 8/2010 | Lee | H04W 36/0088 370/252 |
| 2010/0254360 A1* | 10/2010 | Ueda | H04W 48/12 370/338 |
| 2011/0014922 A1* | 1/2011 | Jen | H04W 74/002 455/450 |
| 2011/0053490 A1* | 3/2011 | Wu | H04W 72/005 455/3.01 |
| 2011/0117912 A1* | 5/2011 | Mahajan | H04W 48/12 455/434 |
| 2011/0216686 A1* | 9/2011 | Wu | H04H 20/71 370/312 |
| 2011/0237218 A1* | 9/2011 | Aoyama | H04H 20/59 455/404.1 |
| 2011/0305183 A1* | 12/2011 | Hsu | H04W 72/005 370/312 |
| 2011/0305184 A1* | 12/2011 | Hsu | H04L 65/4076 370/312 |
| 2012/0236776 A1* | 9/2012 | Zhang | H04W 48/12 370/312 |
| 2013/0039250 A1* | 2/2013 | Hsu | H04H 20/71 370/312 |
| 2013/0044668 A1* | 2/2013 | Purnadi | H04W 36/0055 370/312 |
| 2013/0083715 A1* | 4/2013 | Etemad | H04W 52/04 370/312 |

FOREIGN PATENT DOCUMENTS

| | | |
|---|---|---|
| KR | 10-2006-0133009 A | 12/2006 |
| KR | 10-0689516 B1 | 3/2007 |
| KR | 10-0724900 B1 | 6/2007 |

* cited by examiner

[FIG. 1]
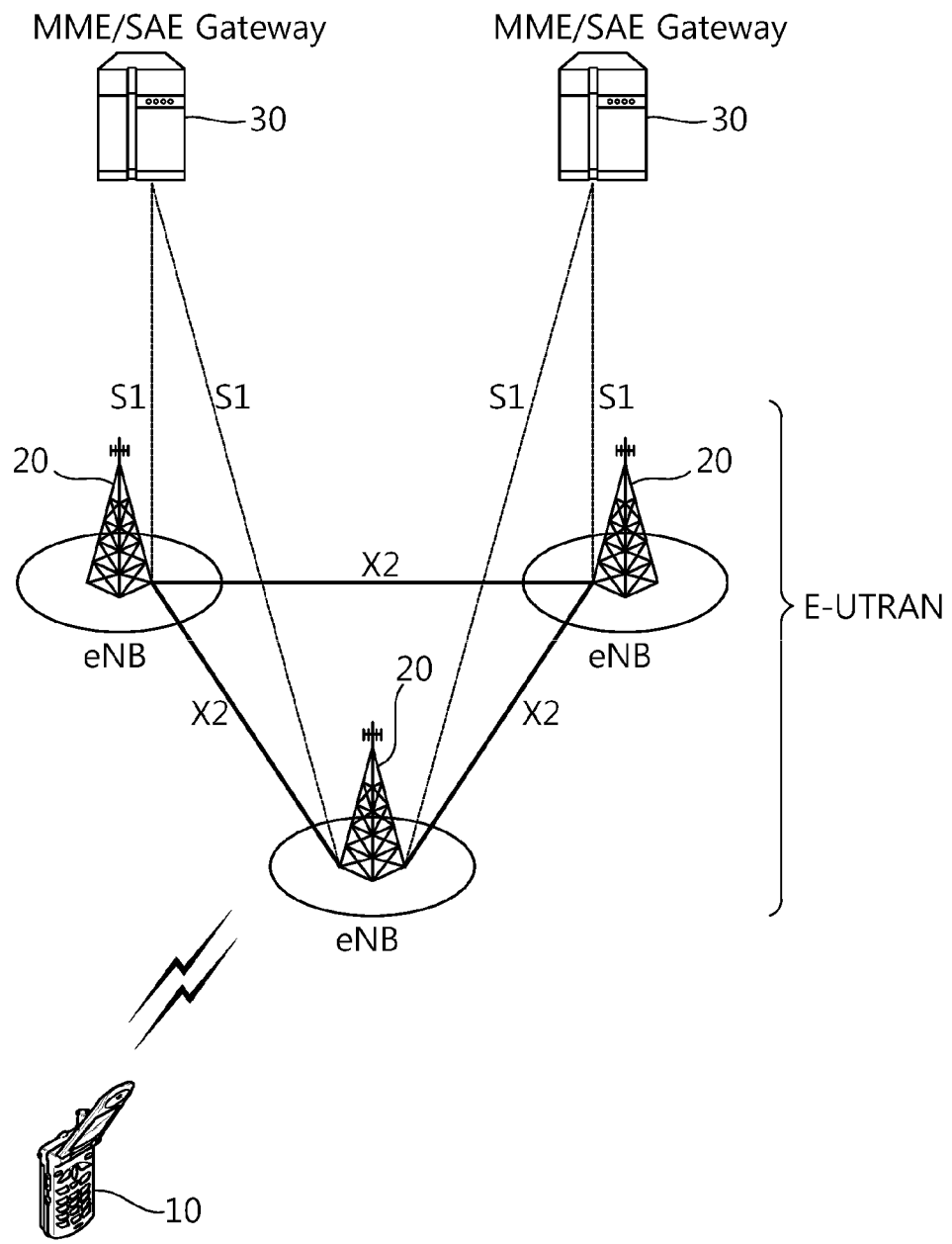

[FIG. 2]
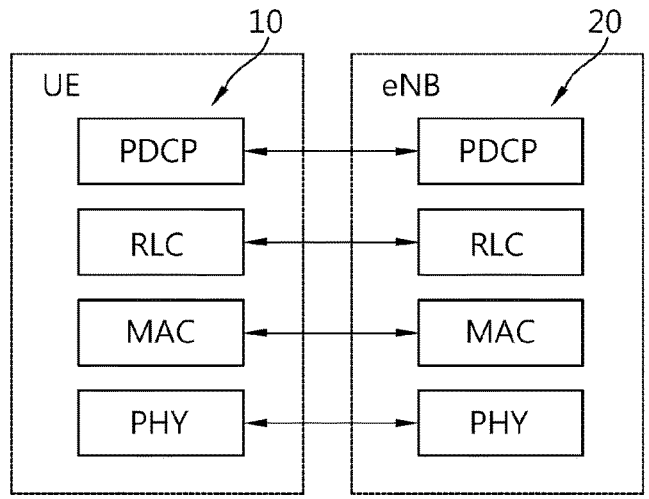
(a)
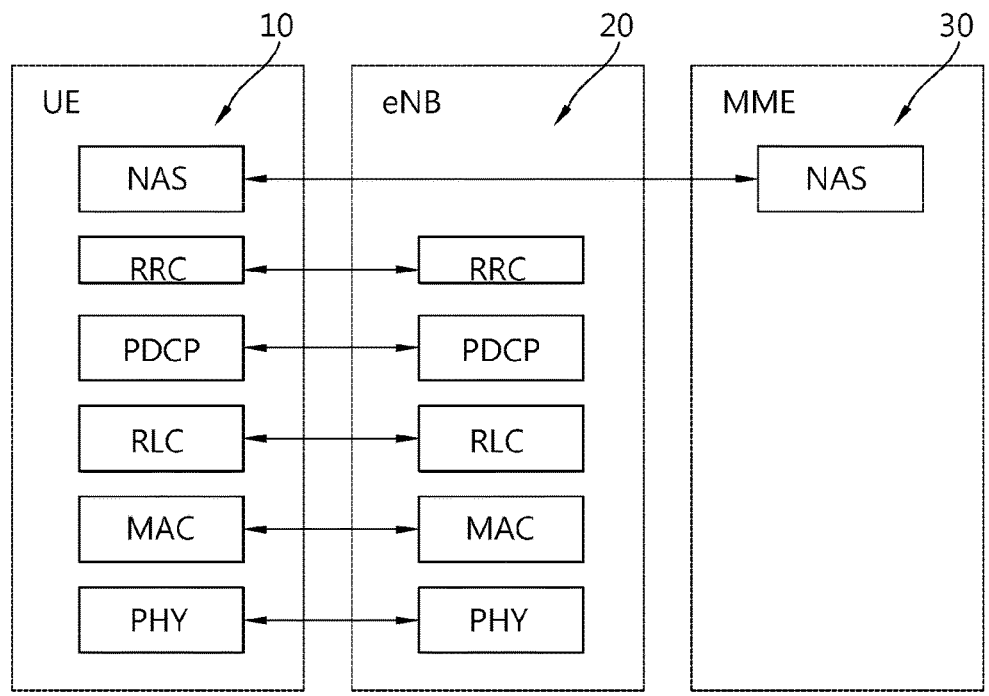
(b)

[FIG. 3]
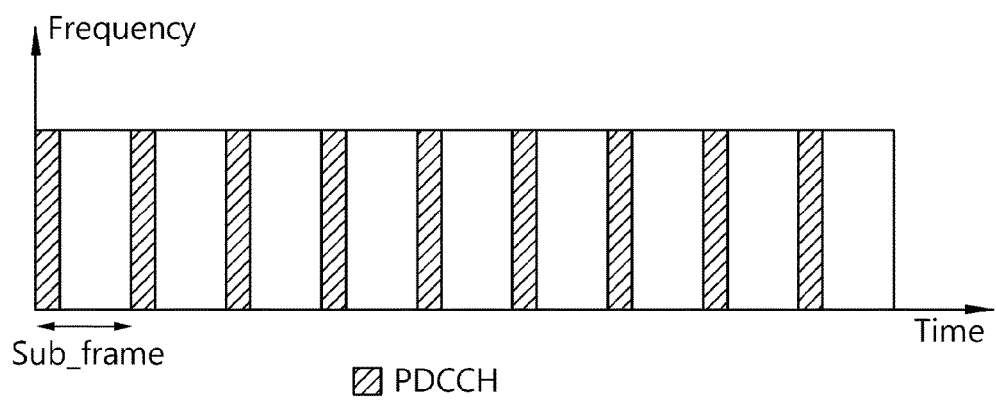

[FIG. 4]
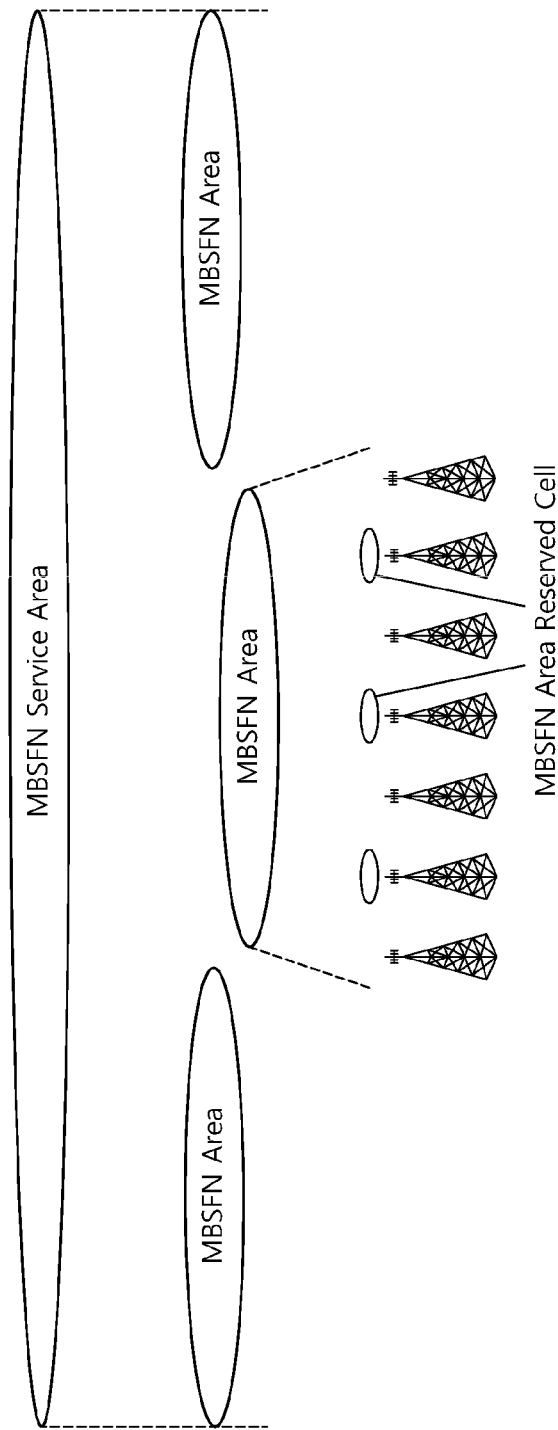

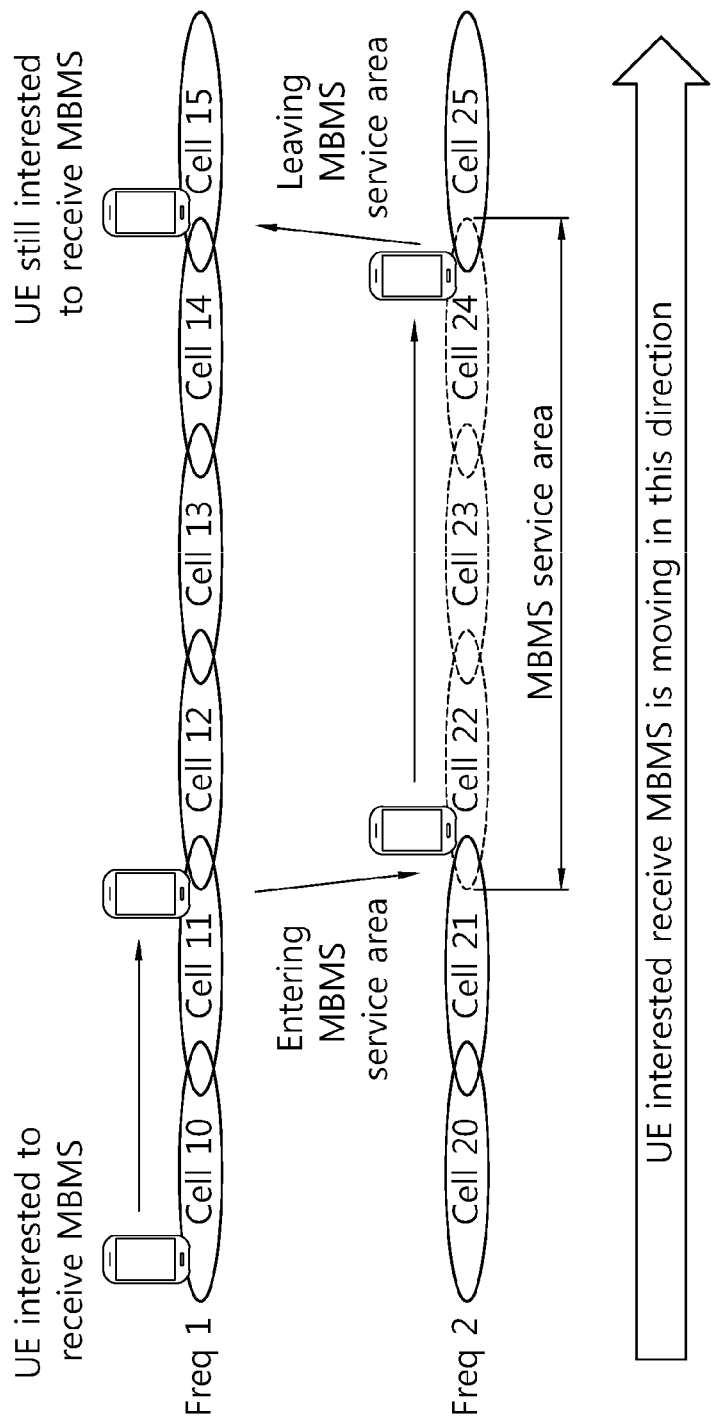

[FIG. 6]
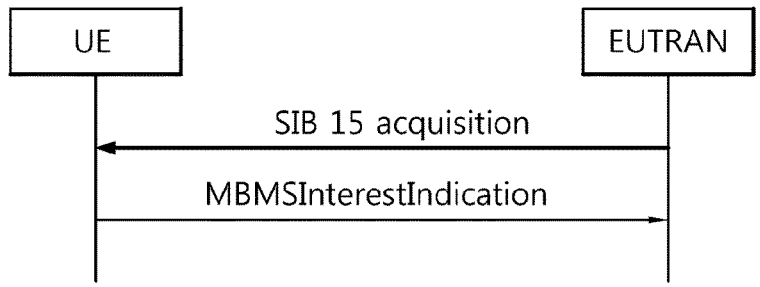
[FIG. 7]
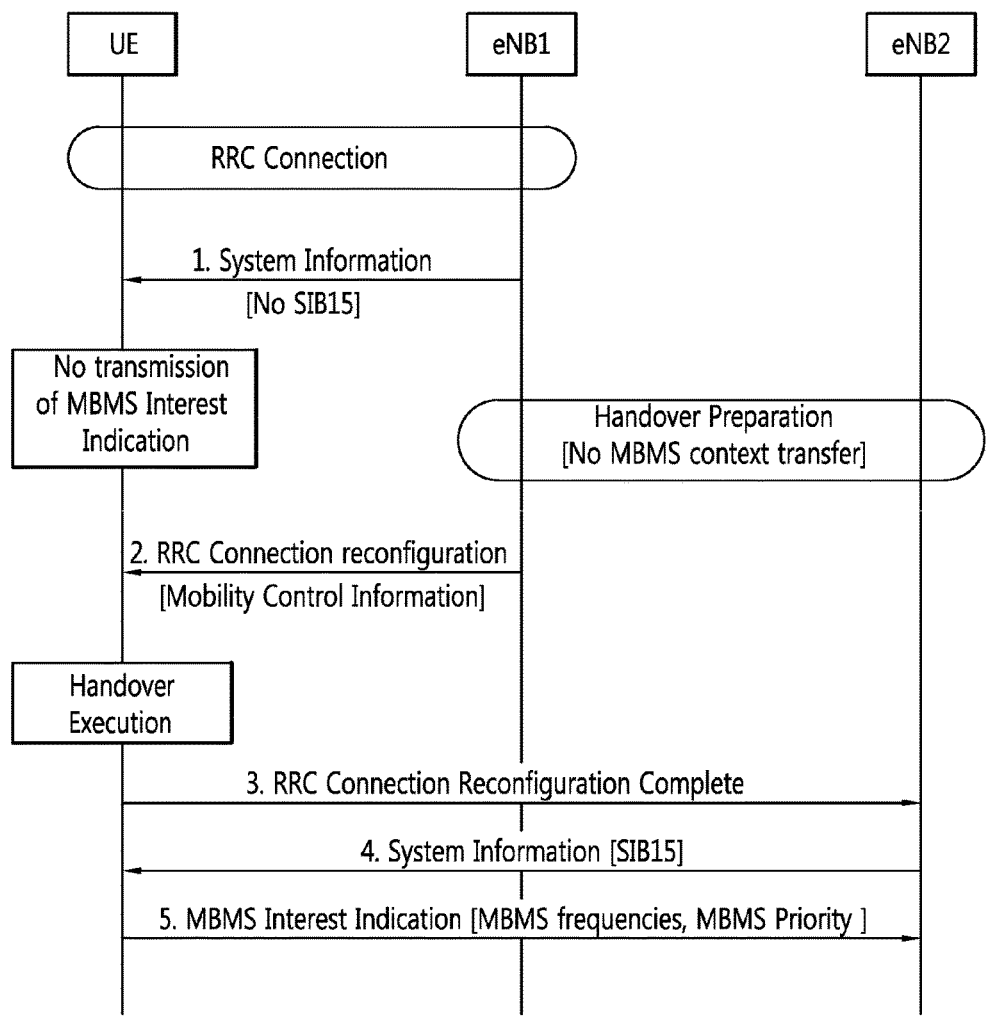

[FIG. 8]
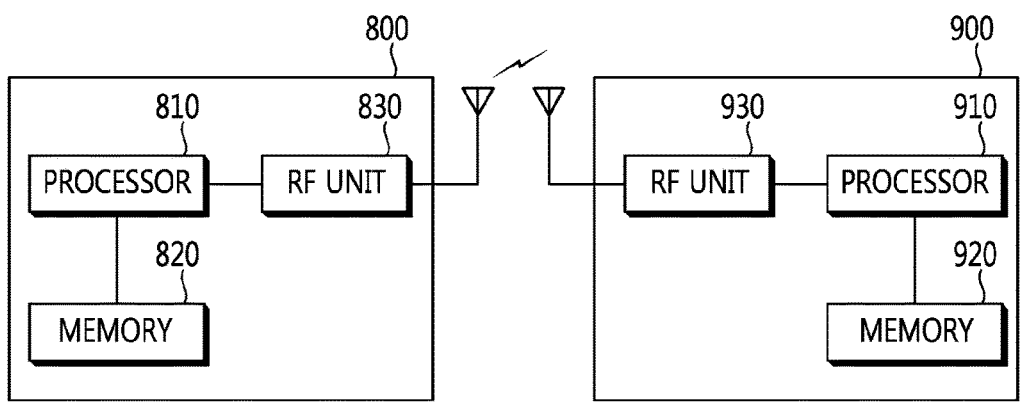

METHOD AND APPARATUS FOR TRANSMITTING SERVICE INTEREST INDICATION MESSAGE IN WIRELESS COMMUNICATION SYSTEM

CROSS REFERENCE TO RELATED APPLICATIONS

This application is the National Phase of PCT/KR2012/007978 filed on Oct. 2, 2012, which claims priority under 35 U.S.C. § 119(e) to U.S. Provisional Application No. 61/542,758 filed on Oct. 3, 2011, all of which are hereby expressly incorporated by reference into the present application.

BACKGROUND OF THE INVENTION

Field of the Invention

The present invention relates to wireless communications, and more particularly, to a method and apparatus for transmitting a service interest indication message in a wireless communication system.

Related Art

A universal mobile telecommunications system (UMTS) is a $3^{rd}$ generation asynchronous mobile communication system operating in wideband code division multiple access (WCDMA) on the basis of European systems such as global system for mobile communications (GSM), general packet radio services (GPRS), etc. Long-term evolution (LTE) of the UMTS is under discussion by $3^{rd}$ generation partnership project (3GPP) which standardizes the UMTS. The 3GPP LTE is a technique for high-speed packet communication. The 3GPP LTE requires cost reduction for a user and a provider, improvement of service quality, extended and improved coverage and system capacity, flexible use of frequency bands, a simple structure, an open interface, a proper power use of a terminal, etc. For this, various methods have been proposed.

The 3GPP LTE can provide a multimedia broadcast/multicast service (MBMS) service. The MBMS is a service which simultaneously transmits data packets to multiple users. If a specific level of users exist in the same cell, the respective users can be allowed to share necessary resources so that the plurality of users can receive the same multimedia data, thereby increasing resource efficiency. In addition, a multimedia service can be used with a low cost from the perspective of users.

The MBMS service can be provided by using a single frequency network (SFN) through a frequency layer shared with a non-MBMS service. A user equipment which intends to receive the MBMS service can acquire information of the MBMS service provided on a current carrier frequency by using system information which is broadcast at a frequency on which the MBMS service is provided.

Meanwhile, there may be a cell which does not transmit system information for the MBMS service. As the user equipment moves, a handover may be performed to the cell which does not transmit the system information for the MBSM service. In this case, the user equipment may not be able to smoothly receive the MBMS service.

Accordingly, there is a need for a method for smoothly receiving the MBMS service by the user equipment.

SUMMARY OF THE INVENTION

The present invention provides a method and apparatus for transmitting a service interest indication message in a wireless communication system. The present invention also provides a method for transmitting a multimedia broadcast/multicast service (MBMS) interest indication message when a user equipment moves from a cell which does not broadcast system information for an MBSM service to a cell which broadcasts the system information.

In an aspect, a method of transmitting a multimedia broadcast/multicast service (MBMS) interest indication message by a user equipment (UE) in a wireless communication system is provided. The method includes receiving system information for an MBMS service which is broadcast from a first base station (BS), and transmitting the MBMS interest indication message to the first BS when the UE performs a handover to the first BS from a second BS which does not broadcast the system information for the MBMS service.

In another aspect, a method of transmitting a multimedia broadcast/multicast service (MBMS) interest indication message by a user equipment (UE) in a wireless communication system is provided. The method includes receiving system information for an MBMS service which is broadcast from a first base station (BS), and transmitting the MBMS interest indication message to the first BS when there is a change in the MBMS service intended to be received by the UE.

In another aspect, a user equipment (UE) for transmitting a multimedia broadcast/multicast service (MBMS) message in a wireless communication system is provided. The UE includes a radio frequency (RF) unit for transmitting or receiving a radio signal, and a processor operatively coupled to the RF unit. The processor is configured for receiving system information for an MBMS service which is broadcast from a first base station (BS), and transmitting the MBMS interest indication message to the first BS when the UE performs a handover to the first BS from a second BS which does not broadcast the system information for the MBMS service.

A user equipment which performs a handover can smoothly receive a multimedia broadcast/multicast service (MBMS) service, and an MBMS service continuity can be maintained.

BRIEF DESCRIPTION OF THE DRAWINGS

FIG. 1 is a block diagram showing a wireless communication system.

FIG. 2 is a block diagram showing a radio protocol structure.

FIG. 3 shows an example of a physical channel structure.

FIG. 4 shows a structure of an MBMS service area and an MBSFN area.

FIG. 5 shows a process of providing an MBMS service continuity to a UE in an idle mode.

FIG. 6 shows an example of transmitting system information for an MBMS service and an MBMS interest indication message according to an embodiment of the present invention.

FIG. 7 shows an example of a method of transmitting an MBMS interest indication message according to an embodiment of the present invention.

FIG. 8 is a block diagram showing a wireless communication system to implement an embodiment of the present invention.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). $3^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

FIG. 1 is a block diagram showing a wireless communication system.

The structure of FIG. 1 is an example of a network structure of an evolved-UMTS terrestrial radio access network (E-UTRAN). An E-UTRAN system may be a 3GPP LTE/LTE-A system. An evolved-UMTS includes a user equipment (UE) 10 and a base station (BS) 20 which provides a control plane and a user plane to the UE. The user equipment (UE) 10 may be fixed or mobile, and may be referred to as another terminology, such as a mobile station (MS), a user terminal (UT), a subscriber station (SS), a wireless device, etc. The BS 20 is generally a fixed station that communicates with the UE 10 and may be referred to as another terminology, such as an evolved node-B (eNB), a base transceiver system (BTS), an access point, etc. There are one or more cells within the coverage of the BS 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Interfaces for transmitting user traffic or control traffic may be used between the BSs 20. The BSs 20 are interconnected by means of an X2 interface. The BSs 20 are connected to an evolved packet core (EPC) by means of an S1 interface. More particularly, the BSs 20 are connected to a mobility management entity (MME) 30 by means of an S1-MME, and are connected to a serving gateway (S-GW) by means of S1-U. The S1 interface supports a many-to-many relation between the BS 20 and the MME/S-GW 30.

Hereinafter, a downlink (DL) denotes communication from the BS 20 to the UE 10, and an uplink (UL) denotes communication from the UE 10 to the BS 20. In the DL, a transmitter may be a part of the BS 20, and a receiver may be a part of the UE 10. In the UL, the transmitter may be a part of the UE 10, and the receiver may be a part of the BS 20.

Layers of a radio interface protocol between the UE and the E-UTRAN can be classified into a first layer (L1), a second layer (L2), and a third layer (L3) based on the lower three layers of the open system interconnection (OSI) model that is well-known in the communication system. The radio interface protocol between the UE and the E-UTRAN can be horizontally divided into a physical layer, a data link layer, and a network layer, and can be vertically divided into a user plane which is a protocol stack for data information transmission and a control plane which is a protocol stack for control signal transmission.

FIG. 2 is a block diagram showing a radio protocol structure. FIG. 2-(a) is a block diagram showing radio protocol architecture for a user plane, and FIG. 2-(b) is a block diagram showing radio protocol architecture for a control plane.

Referring to FIG. 2, a physical (PHY) layer belonging to the L1 provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transmitted through a radio interface. Between different PHY layers, i.e. a PHY layer of a transmitter and a PHY layer of a receiver, data are transferred through the physical channel. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH can carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ ACK/NACK signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

FIG. 3 shows an example of a physical channel structure.

A physical channel consists of a plurality of subframes in a time domain and a plurality of subcarriers in a frequency domain. One subframe consists of a plurality of symbols in the time domain. One subframe consists of a plurality of resource blocks (RBs). One RB consists of a plurality of symbols and a plurality of subcarriers. In addition, each subframe can use specific subcarriers of specific symbols of a corresponding subframe for a PDCCH. For example, a first symbol of the subframe can be used for the PDCCH. A transmission time interval (TTI) which is a unit time for data transmission may be equal to a length of one subframe.

A DL transport channel for transmitting data from the network to the UE includes a broadcast channel (BCH) for transmitting system information, a paging channel (PCH) for transmitting a paging message, a DL-SCH for transmitting user traffic or control signals, etc. The system information carries one or more system information blocks. All system information blocks can be transmitted with the same periodicity. Traffic or control signals of a multimedia broadcast/multicast service (MBMS) are transmitted through a multicast channel (MCH). Meanwhile, a UL transport channel for transmitting data from the UE to the network includes a random access channel (RACH) for transmitting an initial control message, a UL-SCH for transmitting user traffic or control signals, etc.

A MAC layer belonging to the L2 provides a service to a higher layer, i.e. a radio link control (RLC) layer, through a logical channel. A function of the MAC layer includes mapping between the logical channels and the transport channels and multiplexing/de-multiplexing for a transport block provided to a physical channel on a transport channel of a MAC service data unit (SDU) belonging to the logical channel. The logical channels are located above the transport channel, and are mapped to the transport channels. The logical channels can be divided into a control channel for delivering control region information and a traffic channel for delivering user region information.

An RLC layer belonging to the L2 supports reliable data transmission. A function of the RLC layer includes RLC SDU concatenation, segmentation, and reassembly. To ensure a variety of quality of service (QoS) required by a radio bearer (RB), the RLC layer provides three operation modes, i.e. a transparent mode (TM), an unacknowledged mode (UM), and an acknowledged mode (AM). The AM RLC provides error correction by using an automatic repeat request (ARQ). Meanwhile, a function of the RLC layer can be implemented with a functional block inside the MAC layer. In this case, the RLC layer may not exist.

A packet data convergence protocol (PDCP) layer belongs to the L2. A function of a packet data convergence protocol (PDCP) layer in the user plane includes user data delivery, header compression, and ciphering. The header compression has a function for decreasing a size of an IP packet header which contains relatively large-sized and unnecessary control information, to support effective transmission in a radio section having a narrow bandwidth. A function of a PDCP layer in the control plane includes control-plane data delivery and ciphering/integrity protection.

A radio resource control (RRC) layer belonging to the L3 is defined only in the control plane. The RRC layer takes a role of controlling a radio resource between the UE and the network. For this, the UE and the network exchange an RRC message through the RRC layer. The RRC layer serves to control the logical channel, the transport channel, and the physical channel in association with configuration, reconfiguration, and release of RBs. An RB is a logical path provided by the L2 for data delivery between the UE and the network. The configuration of the RB implies a process for specifying a radio protocol layer and channel properties to provide a particular service and for determining respective detailed parameters and operations. The RB can be classified into two types, i.e. a signaling RB (SRB) and a data RB (DRB). The SRB is used as a path for transmitting an RRC message in the control plane. The DRB is used as a path for transmitting user data in the user plane. Meanwhile, when an RRC connection is established between an RRC layer of the UE and an RRC layer of the network, the UE is in an RRC connected state, and otherwise the UE is in an RRC idle mode.

A non-access stratum (NAS) layer belongs to an upper layer of the RRC layer and serves to perform session management, mobility management, or the like.

As a transport channel for an MBMS, an MCH can be mapped to a multicast control channel (MCCH) which is a logical channel for a control signal and a multicast traffic channel (MTCH) which is a logical channel for data. The MCCH can transmit an MBMS-related RRC message. The MTCH can transmit traffic of a specific MBMS service. A single MCCH channel may exist for every single MBSFN area for transmitting the same MBMS information and traffic. Alternatively, when a plurality of MBSFN areas are provided in a single cell, the UE may receive a plurality of MCCHs. When the MBMS-related RRC message is changed in a specific MCCH, the PDCCH can transmit an MBMS radio network temporary identity (M-RNTI) and an MCCH indicator indicating a specific MCCH. By receiving the M-RNTI and the MCCH indicator through the PDCCH, the UE supporting the MBMS can determine that the MBMS-related RRC message is changed in the specific MCCH and can receive the specific MCCH. An RRC message of the MCCH can be changed in every modification period, and can be repetitively broadcast in every repetition period.

FIG. 4 shows a structure of an MBMS service area and an MBSFN area.

The MBMS service area is an area in which a specific MBMS service is provided. Although not shown in FIG. 4, an MBSFN synchronization area is a network area in which all BSs can be synchronized and perform MBSFN transmission. The MBSFN synchronization area can support one or more MBSFN areas. In a given frequency layer, the BS may belong to one MBSFN synchronization area. The MBSFN synchronization area can be configured independent of the MBMS service area. The MBSFN area may include a group of cells in the MBSFN synchronization area. Except for a reserved cell of the MBSFN area, all cells in the MBSFN area can perform MBSFN transmission. When a UE can know which MBSFN area is applied for an MBMS service interested by the UE, it is enough to consider only a subset of the configured MBSFN area. The reserved cell of the MBSFN area is a cell located in the MBSFN area and not performing MBSFN transmission.

Meanwhile, the network can use a counting procedure to calculate the number of UEs receiving a specific service. The counting procedure can be configured such that the network transmits a counting request message, and then the UE transmits a counting response message.

FIG. 5 shows a process of providing an MBMS service continuity to a UE in an idle mode.

Referring to FIG. 5, a service is currently provided to a UE on a first frequency (freq 1). If the UE is interested in receiving of the MBMS service while moving from a cell 10 to a cell 11 on the freq 1, the UE can leave the cell 11 on the freq 1 to enter an MBSFN area by reselecting a cell 22 on a second frequency (freq 2). The UE can reselect the cell 22 by assigning a highest reselection priority to the freq 2. The MBSFN area can be continued from the cell 22 to a cell 24 on the freq 2. As the UE continuously moves, the UE leaves the MBSFN area, and enters a cell 15 on the freq 1.

FIG. 6 shows an example of transmitting system information for an MBMS service and an MBMS interest indication message according to an embodiment of the present invention.

A BS transmits to a UE a system information block (SIB) 15 which is system information defined for the MBMS service. The SIB 15 may include MBMS service area identities (SAIs) of current and/or neighboring carrier frequencies. Table 1 shows an example of the SIB 15.

TABLE 1

ASN1START
SystemInformationBlockType15-r11 ::= SEQUENCE {
sai-IntraFreq-r11 MMBMS-SAI-List-r11 OPTIONAL, -- Need OR
sai-InterFreqList-r11 MBMS-SAI-InterFreqList-r11 OPTIONAL, -- Need OR
lateNonCriticalExtension OCTET STRING OPTIONAL, -- Need OP
...}
MBMS-SAI-List-r11 ::= SEQUENCE (SIZE (1..maxSAI-MBMS-r11)) OF MBMS-SAI-r11

TABLE 1-continued

```
MBMS-SAI-r11::= INTEGER (0..65535)
MBMS-SAI-InterFreqList-r11 ::= SEQUENCE (SIZE (1..maxFreq))
OF MBMS-SAI-InterFreq-r11
MBMS-SAI-InterFreq-r11 ::= SEQUENCE {
dl-CarrierFreq ARFCN-ValueEUTRA,
sai-List-r11 MBMS-SAI-List-r11,
...}
-- ASN1STOP
```

In Table 1, a 'sai-IntraFreq' field includes a list of MBMS SAIs of a carrier frequency currently accessed by the UE. A 'sai-InterFreqList' field includes a list of neighboring frequencies providing an MBMS service and a list of MBMS SAIs corresponding thereto. A 'sai-List' field includes a list of MBMS SAIs for a specific frequency.

The UE in the RRC-connected state transmits the MBMS interest indication message to the BS through an MBMS point to multipoint radio bearer (MRB). The UE can report to the BS a frequency, which provides a currently received or interested MBMS service, through the MBMS interest indication message. The UE can report to the BS a frequency, which provides a no longer received or interested MBMS service, through the MBMS interest indication message. In addition, the UE can report whether reception of the MBMS service is prioritized over unicast reception through the MBMS interest indication message. The MBMS interest indication message can be transmitted through a dedicated control channel (DCCH) which is a logical channel. A signaling radio bearer (SRB) for the MBMS interest indication message is an SRB1, and the MBMS interest indication message can be transmitted based on a confirmation mode. Table 2 shows an example of the MBMS interest indication message.

TABLE 2

```
ASN1START
MBMSInterestIndication-r11 ::= SEQUENCE {
criticalExtensions CHOICE {
c1 CHOICE {
interestIndication-r11 MBMSInterestIndication-r11-IEs,
spare3 NULL, spare2 NULL, spare1 NULL
},
criticalExtensionsFuture SEQUENCE { }
}
}
MBMSInterestIndication-r11-IEs ::= SEQUENCE {
mbms-FreqList-r11 CarrierFreqListMBMS-r11 OPTIONAL,
mbms-Priority-r11 ENUMERATED {true} OPTIONAL,
lateNonCriticalExtension OCTET STRING OPTIONAL,
nonCriticalExtension SEQUENCE { } OPTIONAL
}
-- ASN1STOP
```

In Table 2, the mbms-FreqList field indicates a list of frequencies which provide an MBMS service currently received or interested by the UE. The mbms-Priority field indicates whether MBMS reception is prioritized over unicast reception by the UE. If reception of a frequency which provides all MBMS services is prioritized over reception of a unicast bearer by the UE, a value of the mbms-Priority field may be 'true'. Otherwise, the mbms-Priority field may be omitted.

Upon receiving the MBMS interest indication message, the BS can know that the UE is interested in moving to a cell operating at a frequency which provides the MBMS service. The BS can allow the UE to be handed over to a cell of a specific frequency which provides a specific MBMS service, and can allow the UE to smoothly receive the MBMS service after the handover. In addition, if the UE is handed over from a first BS to a second BS, the first BS can deliver the MBMS interest indication message received from the UE to the second BS through an MBMS UE context. That is, the UE does not have to retransmit the MBMS interest indication message to the second BS. Even after the UE is handed over to the second BS, the second BS can allow the UE to continuously smoothly receive the MBMS service.

Meanwhile, if the UE is handed over from the first BS to the second BS, the second BS may be a BS which does not support the MBMS service. In this case, the MBMS UE context cannot be delivered to the second BS in a handover procedure. The second BS cannot understand the MBMS interest indication message delivered from the first BS, and a network may lose information on the MBMS service interested by the UE. That is, an MBMS service continuity may not be maintained. Therefore, a problem may occur in the smoothly receiving of the MBMS service after the UE is handed over to the second BS.

Therefore, in order to allow the UE performing a handover to smoothly receive the MBSM service, it can be provided a method in which the UE determines whether a target BS is a BS supporting the MBMS service continuity through system information, and if the target BS is the BS supporting the MBMS service continuity, transmits an MBMS interest indication message.

FIG. 7 shows an example of a method of transmitting an MBMS interest indication message according to an embodiment of the present invention.

1. A UE which currently receives or intends to receive a specific MBMS service may be in an RRC-connected state with respect to a first BS. The UE can receive system information which is broadcast by the first BS, and can determine whether the first BS broadcasts the system information for the MBMS service. The system information for the MBMS service may be the SIB15 of Table 1.

If the first BS broadcasts the system information for the MBMS service, the UE can determine that the first BS supports the MBMS interest indication message. If the first BS does not broadcast the system information for the MBMS service, the UE can determine that the first BS does not support the MBMS interest indication message. It is assumed in FIG. 7 that the first BS does not support the MBMS interest indication message. Therefore, the UE does not transmit the MBMS interest indication message to the first BS.

2. As the UE moves, the first BS and the second BS may prepare a handover of the UE. Since the first BS does not support the MBMS interest indication message, the MBMS interest indication message cannot be delivered to the second BS in a process of delivering an MBMS UE context from the first BS to the second BS.

In order to instruct the UE to perform the handover, the first BS transmits an RRC connection reconfiguration message to the UE. The RRC connection reconfiguration message may include mobility control information. The UE can determine that the received RRC connection reconfiguration message is a handover command message and then can perform a handover to the second BS.

In this case, the BS can report to the UE whether the MBMS interest indication message is delivered between BSs through the RRC connection reconfiguration message. If the MBMS interest indication message is delivered between the BSs and this is reported to the UE through the RRC connection reconfiguration message, the UE does not have to retransmit the MBMS interest indication message including the same information after performing the handover to the second BS. If the UE knows through the RRC connection reconfiguration message that the MBMS interest indication message is not delivered between the BSs, the UE can transmit the MBMS interest indication message including the same information to the second BS.

3. After performing the handover to the second BS, the UE transmits a connection reconfiguration complete message to the second BS in order to complete the handover. If the UE fails in the handover or if a radio link failure occurs, the UE performs an RRC connection reestablishment process. The UE selects a cell through the RRC connection reestablishment process, transmits an RRC connection reestablishment request message to the selected cell, and thus can perform an RRC connection reestablishment to the selected cell.

4. The UE connected to the second BS receives system information from the second BS. The UE can determine whether the second BS broadcasts system information for an MBMS service. The system information for the MBMS service may be the SIB15 of Table 1.

5. In a case where the UE moves from the first BS to the second BS due to the handover or the RRC connection reestablishment, if the first BS does not broadcast the system information for the MBSM service but the second BS broadcasts the system information for the MBMS service, the UE transmits the MBMS interest indication message to the second BS. The UE can transmit the MBMS interest indication message to the second BS irrespective of whether the MBMS is updated. In this case, the first BS may not be a BS which is RRC-connected immediately before being RRC-connected to the second BS. The first BS may be any BS which is connected after the UE lastly transmits the MBMS interest indication message and which does not broadcast the system information for the MBMS service.

The MBMS interest indication message transmitted by the UE may be the MBMS interest indication message of Table 2. That is, the MBMS interest indication message may include the mbms-FreqList field and the mbms-Priority field. The mbms-FreqList field indicates a list of frequencies which provide an MBMS service currently received or interested by the UE. The mbms-Priority field indicates whether MBMS reception is prioritized over unicast reception by the UE.

Alternatively, in a case where the UE moves from the first BS to the second BS due to the handover or the RRC connection reestablishment, if the first BS broadcasts the system information for the MBMS service and the second BS also broadcasts the system information for the MBMS service, the UE does not transmit the MBMS interest indication message to the second BS except for a case where the MBMS interest indication message is changed. This is a case where the first BS delivers the MBMS interest indication message to the second BS through the MBMS UE context. If a frequency which provides an MBMS service intended to be received by the UE is changed after the UE lastly transmits the MBMS interest indication message, the UE can transmit the MBMS interest indication message to the second BS.

FIG. 8 is a block diagram showing a wireless communication system to implement an embodiment of the present invention.

An eNB 800 may include a processor 810, a memory 820 and a radio frequency (RF) unit 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A UE 900 may include a processor 910, a memory 920 and an RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method of transmitting data by a user equipment (UE) in a wireless communication system, the method comprising:

connecting, by the UE, to a first cell of a network;

checking, by the UE, whether the first cell broadcasts specific system information for multimedia broadcast/multicast service (MBMS) service continuity;

after checking that the first cell broadcasts the specific system information for MBMS service continuity, transmitting, by the UE, a first MBMS interest indication message to the network, while the UE is connected to the first cell;

disconnecting, by the UE, from the first cell and connecting, by the UE, to a second cell of the network;

checking, by the UE, whether the second cell broadcasts the specific system information for MBMS service continuity;

after checking that the second cell does not broadcast the specific system information for MBMS service continuity, not transmitting, by the UE, an MBMS interest indication message to the network, while the UE is connected to the second cell;

disconnecting, by the UE, from the second cell and connecting to a third cell of the network;

checking, by the UE, whether both the third cell broadcasts the specific system information for MBMS service continuity and the second cell did not broadcast the specific system information for MBMS service continuity; and after checking that both the third cell broadcasts the specific system information for MBMS service continuity and the second cell did not broadcast the specific system information for MBMS service continuity, transmitting, by the UE, a second MBMS interest indication message to the network, while the UE is connected to the third cell, wherein the UE is in a connected mode, and wherein the first and second MBMS interest indication messages include a list of frequencies which provide an MBMS service currently received or intended to be received by the UE.

2. The method of claim 1, wherein the specific system information for MBMS service continuity is broadcast as a system information block (SIB) 15.

3. The method of claim 1, wherein the first and second MBMS interest indication messages include an indicator indicating whether reception of an MBMS service is prioritized over reception of a unicast service.

4. The method of claim 1, wherein the UE and the first cell are in a radio resource control (RRC)-connected state after the UE connects to the first cell.

5. A user equipment (UE) configured to transmit data in a wireless communication system, the UE comprising:
  a radio frequency (RF) unit configured to transmit and receive a radio signal; and
  a processor operatively coupled to the RF unit and configured to:
    connect to a first cell of a network,
    check whether the first cell broadcasts specific system information for multimedia broadcast/multicast service (MBMS) service continuity,
    after checking that the first cell broadcasts the specific system information for MBMS service continuity, transmit a first MBMS interest indication message to the network via the RF unit, while the UE is connected to the first cell,
    disconnect from the first cell and connect to a second cell of the network,
    check whether the second cell broadcasts the specific system information for MBMS service continuity,
    after checking that the second cell does not broadcast the specific system information for MBMS service continuity, not transmit an MBMS interest indication message to the network, while the UE is connected to the second cell,
    disconnect from the second cell and connect to a third cell of the network, and
    after checking that both the third cell broadcasts the specific system information for MBMS service continuity and the second cell did not broadcast the specific system information for MBMS service continuity, transmit a second MBMS interest indication message to the network via the RF unit, while the UE is connected to the third cell,
  wherein the UE is in a connected mode, and
  wherein the first and second MBMS interest indication messages include a list of frequencies which provide an MBMS service currently received or intended to be received by the UE.

6. The UE of claim 5, wherein the specific system information for MBMS service continuity is broadcast as a system information block (SIB) 15.

7. The UE of claim 5, wherein the first and second MBMS interest indication messages include an indicator indicating whether reception of an MBMS service is prioritized over reception of a unicast service.

8. The UE of claim 5, wherein the UE and the first cell are in a radio resource control (RRC)-connected state after the UE connects to the first cell.

* * * * *